United States Patent
Wu

(10) Patent No.: US 12,159,112 B2
(45) Date of Patent: Dec. 3, 2024

(54) HIERARCHICAL MACHINE LEARNING ARCHITECTURE INCLUDING MASTER ENGINE SUPPORTED BY DISTRIBUTED LIGHT-WEIGHT REAL-TIME EDGE ENGINES

(71) Applicant: Singularity Systems Inc., Princeton, NJ (US)

(72) Inventor: Tianhao Wu, Princeton Junction, NJ (US)

( * ) Notice: Subject to any disclaimer, the term of this patent is extended or adjusted under 35 U.S.C. 154(b) by 366 days.

(21) Appl. No.: 17/600,229

(22) PCT Filed: Mar. 31, 2020

(86) PCT No.: PCT/US2020/025959
§ 371 (c)(1),
(2) Date: Sep. 30, 2021

(87) PCT Pub. No.: WO2020/205861
PCT Pub. Date: Oct. 8, 2020

(65) Prior Publication Data
US 2022/0188517 A1    Jun. 16, 2022

Related U.S. Application Data

(60) Provisional application No. 62/828,733, filed on Apr. 3, 2019, provisional application No. 62/829,567, filed
(Continued)

(51) Int. Cl.
*G06F 40/284* (2020.01)
*G06F 3/0482* (2013.01)
(Continued)

(52) U.S. Cl.
CPC ............ *G06F 40/30* (2020.01); *G06F 3/0482* (2013.01); *G06F 18/214* (2023.01); *G06F 40/14* (2020.01);
(Continued)

(58) Field of Classification Search
CPC ..... G06N 20/00; G06F 40/284; G06F 40/205; G06F 40/14
(Continued)

(56) References Cited

U.S. PATENT DOCUMENTS

2006/0031202 A1    2/2006   Chang et al.
2006/0117019 A1    6/2006   Sylthe et al.
(Continued)

FOREIGN PATENT DOCUMENTS

CN    106779087 B    5/2017
WO    2018206405 A1    11/2018

OTHER PUBLICATIONS

Akbar et al., "Pattern Discovery for Semi-structured Web Pages using Bar-Tree Representation." Group for Bioinformatics and Information Mining, Apr. 14, 2011, pp. 1-9.
(Continued)

*Primary Examiner* — George C Monikang
(74) *Attorney, Agent, or Firm* — Zhong Law, LLC

(57) ABSTRACT

A system and method relate to a processing device implementing a master artificial intelligence (AI) engine to receive, from each of one or more real-time AI engines, a machine learning algorithm, parameters associated with the machine learning algorithm, and features employed to train the parameters, receive labeled data used to train the parameters associated with the machine learning algorithm, and construct, based on a combination rule, a master machine learning model using the features, the machine learning algorithm, and the parameters associated with the machine learning algorithm received from each of the one or more real-time AI engines.

15 Claims, 9 Drawing Sheets

Related U.S. Application Data on Apr. 4, 2019, provisional application No. 62/831,539, filed on Apr. 9, 2019.

(51) Int. Cl.
  *G06F 18/214* (2023.01)
  *G06F 40/14* (2020.01)
  *G06F 40/205* (2020.01)
  *G06F 40/30* (2020.01)
  *G06N 20/00* (2019.01)

(52) U.S. Cl.
  CPC .......... *G06F 40/205* (2020.01); *G06F 40/284* (2020.01); *G06N 20/00* (2019.01)

(58) Field of Classification Search
  USPC ................................................. 704/201, 202
  See application file for complete search history.

(56) References Cited

U.S. PATENT DOCUMENTS

| | | |
|---|---|---|
| 2009/0119095 A1 | 5/2009 | Beggelman et al. |
| 2011/0099532 A1 | 4/2011 | Coldicott et al. |
| 2014/0279753 A1 | 9/2014 | Dalessandro et al. |
| 2015/0019204 A1 | 1/2015 | Simard et al. |
| 2016/0012350 A1 | 1/2016 | Narayanan et al. |
| 2016/0098387 A1 | 4/2016 | Bruno et al. |
| 2016/0162456 A1 | 6/2016 | Munro et al. |
| 2016/0239761 A1 | 8/2016 | Simard et al. |
| 2017/0213155 A1 | 7/2017 | Hammond et al. |
| 2017/0308800 A1 | 10/2017 | Cichon et al. |
| 2017/0315984 A1 | 11/2017 | Goyal et al. |
| 2018/0373696 A1 | 12/2018 | Terry et al. |
| 2020/0118007 A1* | 4/2020 | Hong ....................... G06N 3/08 |

OTHER PUBLICATIONS

Dong et al., "A Statistical Parsing Framework for Sentiment Classification." Association for Computational Linguistics, Jan. 28, 2015, pp. 1-44.

International Application No. PCT/US2020/025959, International Search Report and Written Opinion mailed Sep. 1, 2020, 13 pages.

International Application No. PCT/IB2020/000338, International Search Report and Written Opinion mailed Sep. 16, 2020, 11 pages.

European Application No. 20782652.0, Extended European Search Report mailed Nov. 23, 2022, 8 pages.

US Office Action for U.S. Appl. No. 17/600,253, dated Jan. 2, 2024, 21 pages.

Written Opinion for Singapore Patent Application No. 11202112268S, dated Jan. 17, 2024, 6 pages.

Search Report for Singapore Patent Application No. 11202112268S, dated Jan. 10, 2024, 2 pages.

Olson R. S. et al., TPOT: A Tree-based Pipeline Optimization Tool for Automating Machine Learning. Proceedings of the Workshop on Automatic Machine Learning, Dec. 4, 2016, vol. 64, pp. 66-74.

Search Report for Singapore Patent Application No. 11202112327V, dated Feb. 8, 2024, 4 pages.

Written Opinion for Singapore Patent Application No. 11202112327V, dated Feb. 8, 2024, 6 pages.

* cited by examiner

HIERARCHICAL MACHINE LEARNING ARCHITECTURE INCLUDING MASTER ENGINE SUPPORTED BY DISTRIBUTED LIGHT-WEIGHT REAL-TIME EDGE ENGINES

CROSS-REFERENCE TO RELATED APPLICATIONS

This application is the U.S. national stage of PCT/US2020/025959 filed on Mar. 31, 2020, which claims the benefits of U.S. Provisional Application Nos. 62/828,733 filed on Apr. 3, 2019, 62/829,567 filed on Apr. 4, 2019, and 62/831,539 filed Apr. 9, 2019. The contents of the above-mentioned applications are incorporated herein in their entirety.

TECHNICAL FIELD

The present disclosure relates to machine learning, and in particular, to a hierarchical machine learning architecture including a master machine learning engine supported by distributed real-time light-weight edge machine learning engines.

BACKGROUND

Machine learning models may include parameterized computer units for producing an output from an input. One class of machine learning models may include different types of neural networks. Each neural network model may include layers of computational units for calculating an output result from input data. The layer for receiving the input data is commonly referred to as the input layer, and the layer for producing the output result is commonly referred to as the output layer. The one or more layers between the input layer and the output layer are commonly referred to as the hidden layers. Each one of the hidden layers may include computation units (linear or non-linear computation units) with parameters for calculating intermediate results that may determine the final result in a forward propagation (i.e., calculations from the input layer propagated to the output layer).

The parameters associated with each computation unit may be determined in a model training step. Training data are used in the training step to determine these parameters. The training data may include pairs of test input data and its corresponding ideal output. In the training step, a processing device may be programmed to execute the neural network in a forward propagation to calculate a first output from a first test input data, where the neural network may include computation units assigned with initial parameters. The processing device may further calculate a difference between the target output and the first output, and may adjust the parameters based on the difference in a backpropagation propagated from the output layer to the input layer. The training step may include multiple iterations of forward propagations and backpropagations using multiple training data. Thus, the training of a machine learning may take a long time and require a large set of training data to arrive at a trained model that can be used in the application.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1:
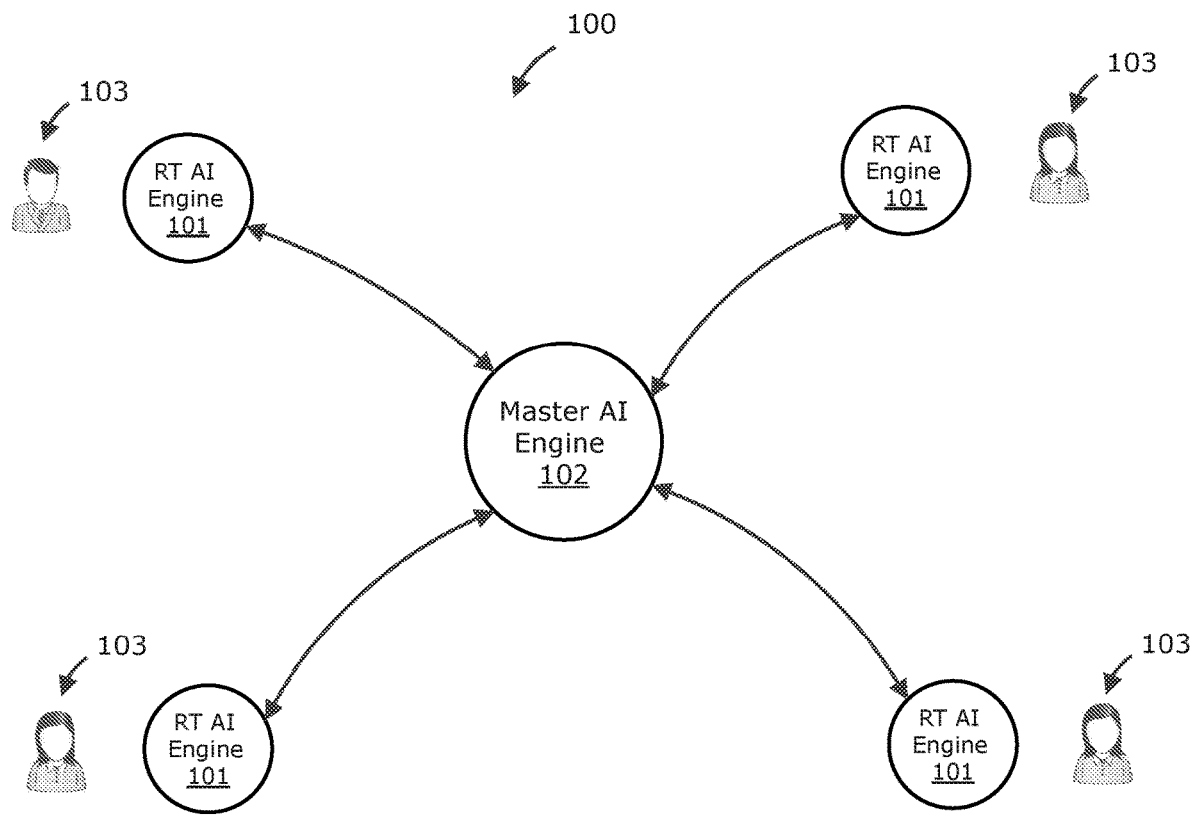
FIG. 1 illustrates a hierarchical machine learning system according to an implementation of the disclosure.

To overcome the above-identified technical problems in machine learning, implementations of the disclosure provide a hierarchical machine learning architecture that includes a master machine learning engine (referred to as the "master AI engine") supported by one or more real-time light-weight edge machine learning engines (referred to as the "real-time AI engines"). A real-time AI engine may be implemented in computer hardware with limited computing resources interacting with a human subject matter expert (referred to as an "operator"). Thus, each real-time AI engine may train aspects of machine learning models using a small set of examples, and provide these aspects of machine learning models to the master AI engine. The aspects provided to the master AI engine may include candidate features relied upon by one or more real-time AI engines, candidate machine learning algorithms employed by one or more real-time AI engines, and candidate parameter values associated with the candidate machine learning algorithms and learned by the one or more real-time AI engines. The master AI engine may further aggregate all of these aspects provided by the real-time AI engines into one hierarchical machine learning model. The master AI engine may further optimize the hierarchical machine learning model, and provide feedbacks to each of the real-time AI engines to further improve the performance of the real-time AI engines to further boost real-time AI engines performance to make them more general, more robust, and more accurate.

Implementations of this disclosure allow operators and real-time AI engines to interact with each other to train the real-time AI engines, and then provide aspects of the real-time AI engines to the master engine to construct a hierarchical machine learning model so that a high-quality machine learning model can be constructed within a short period of time using very few labeled examples and consuming less computing resources.

Implementations of the disclosure may be deployed in the practical application of document processing. A document processing software application when executed by a processing device may receive a document (e.g., a form) and train one or more real-time AI engines to recognize fields (e.g., name, address, invoice number, payment amount) and values specified in these fields. The document can be prepared in any suitable language (e.g., English, French, Chinese, Japanese) and in any suitable format (e.g., financial forms, business forms, government forms, medical forms, legal forms) while the fields and values, depending upon the language, can be alphanumerical strings (e.g., English) or characters (e.g., Chinese). The document processing software application may extract these values from the corresponding fields, and populate a database with these extracted values. In this way, the documents may be accurately and quickly entered into the database without incurring the significant costs and errors associated with human operators.

The real-time AI engines employed in document processing can be linear regression, logic regression, decision tree, support vector machine (SVM), Bayesian, gradient boosting machine (e.g., lightGBM), or neural network models. The training of the real-time AI engines may include selection of machine learning algorithms based on the input data. The real-time AI engines may be initialized with starting parameter values (e.g., default parameter values) that may be iteratively adjusted to optimal parameter values in the model training stage. Properly trained real-time AI engines may be used to recognize fields and extract values associated with the fields in a recognition stage. Further, the properly trained real-time AI engines may provide different aspects to the master AI engine.

Implementations of the disclosure relate to system and methods for training real-time AI engines in real time using very few examples. In certain applications, an operator (e.g., serving as an expert) may be in the loop to determine whether an output generated during the training process corresponds to a test data based on previously-generated labels or based on the operator's knowledge. By comparing the output generated by the real-time AI engine with the target output, the operator may determine whether the generated output is a positive result (i.e., the generated output matches the target output) or a negative result (i.e., the generated output does not match the target output). Based on the determination, the operator may use a user interface to tag the output as corresponding to the test input data or as not corresponding to the test input data. In some implementations, the operator can serve as the expert, thus eliminating the need to create the training data set in advance. Instead, the operator may provide the expert knowledge in the loop during the training of the real-time AI engine.

The training process of a real-time AI engine may be carried out in multiple steps. For example, at the beginning of the training stage for a document processing application, a machine learning model may be used to generate an initial result with respect to a test dataset. A processor executing a real-time training program may start to label a data sample (e.g., a word, a sentence) in the training data responsive to each tagging action by the operator directed to the data sample on the user interface. The action may indicate a positive tagging (e.g., selecting a text word) or a negative tagging (e.g., de-selecting or removing the text word). Based on the labeling of the data sample, a processing device may train the real-time AI engine by adjusting the parameters of underlying machine learning algorithms in a direction that minimizes the overall error rate. In one implementation, the time required for each update of all parameters of the real-time AI engine can be less than 1 or 2 seconds for each engine in the learning step. This allows the processing device to present the updated intermediate results on the user interface without noticeable delay to the operator. The intermediate learning results may be presented on a user interface so that the operator can observe the model's results in real time and determine where the real-time AI engine is correct and where the real-time AI engine causes more errors. Based on the intermediate learning results, the operator may again select the correct answers and de-select the errors to make corrections, and the processing device may continue to improve the real-time AI engine based on user's feedback(s) in the real-time training process.

FIG. 1 illustrates a hierarchical machine learning system 100 according to an implementation of the disclosure. System 100 may be implemented on a standalone computer system or a networked computing resource implemented in a computing cloud. Referring to FIG. 1, system 100 may include one or more real-time AI engines 101 and a master AI engine 102 that works collaboratively with the one or more real-time AI engines 101. Each of the real-time AI engine can be a light-weight machine learning model that can be trained and run in real time. During the training of the real-time AI engine, a human operator 103 may be situated in the loop to provide expert knowledge to determine whether the output generated by the real-time AI engine is correct or not. In addition to the training by operator 103, real-time AI engines 101 may provide candidate features, candidate algorithms, and candidate parameter values associated with the candidate algorithms to the master AI engine 102. Master AI engine 102 may aggregate the candidate features, the candidate algorithms, and candidate parameter values associated with the candidate algorithms to determine the optimal features, algorithms, and parameters based on rules. The master AI engine 102 may cause updates of the real-time AI engines based on the optimal features, algorithms, and parameters. Thus, performance of the real-time AI engines 101 may be further improved by master AI engine 102 in addition to the operator-assisted training.

In one implementation, real-time AI engines 101 can be implemented as programs embedded in a web browser interface. Master AI engine 102 can be implemented as a server program on the same computer as real-time AI engines 101. Alternatively, master AI engine 102 can be implemented in a remote computer or in a cloud that is connected to the computers running real-time AI engines 101 through a network (not shown).

Figure 2:
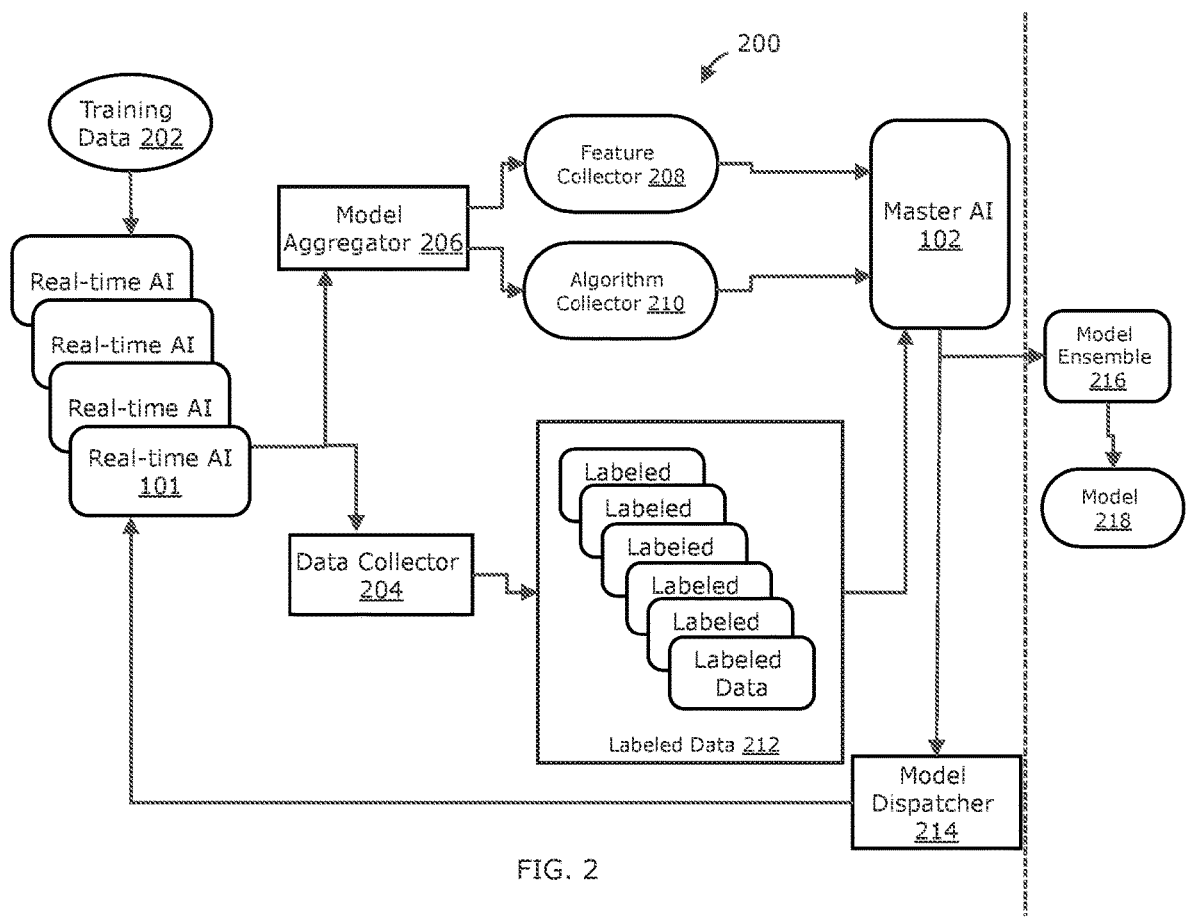
FIG. 2 illustrates a hierarchical machine learning system including components to collaborate between real-time AI engines and a master AI engine according to an implementation of the disclosure.

Real-time AI engines 101 and master AI engine 102 may work collaboratively to produce the trained machine learning model. FIG. 2 illustrates a hierarchical machine learning system 200 including components to collaborate between real-time AI engines 101 and master AI engine 102 according to an implementation of the disclosure. Referring to FIG. 2, in addition to the one or more real-time AI engines 101 and master AI engine 102, system 200 may include a data collector 204, a model aggregator 206, a feature collector 208, an algorithm collector 210, and a model dispatcher 214.

Real-time AI engines 101 are light-weight edge machine learning engine that can be used to train light-weight machine learning models. Each real-time AI engine 101 may be involved with an operator 103 (or subject matter expert (SME)) who may assist the training of the underlying machine learning algorithm. A detailed implementation of real-time AI engine is provided later in conjunction with FIG. 3. The underlying machine learning algorithms associated with real-time AI engines 101 may be identical or different from each other. Thus, real-time AI engines 101 may be trained concurrently to identify a common type of instances or different types of instances. Real-time Ain engine 101 may use training data 202 (e.g., document data) to train the underlying machine learning algorithms. The training data may first be converted into features associated with the data. The training of the machine learning algorithm may include adjusting the parameters of the machine learning algorithm based on operator's labeling action on the training data. Thus, the training process with the assistance of the operator may produce candidate features, candidate algorithms and parameters associated with the algorithms, and operator-labeled data (referred to as the gold data).

System 200 may further include a data collector 204 that may collect the operator-labeled data from real-time AI engines 101. Further, data collector 204 may store labeled data in a data store 212 that may in turn provide labeled data to master AI engine 102. System 200 may further include a model aggregator 206 that may collect model-related information from real-time AI engines 101. The model-related information may include machine learning algorithms and the associated parameters as well as features used for training the machine learning algorithms. Feature collector 208 may provide features extracted by model aggregator 206 to master AI engine 102; algorithm collector 210 may provide algorithms and their corresponding parameters extracted by model aggregator 206 to master AI engine 102.

With respect to a particular machine learning task (e.g., recognizing the invoice number on an invoice), different real-time AI engines 101 may employ a respective underlying machine learning algorithm to solve the machine learning task. Thus, each real-time AI engine 101 may capture operator's expert knowledge using a unique machine learning algorithm. Real-time AI engines 101 may then provide aspects of the task learned by the underlying machine learning algorithms to master AI engine 102 for further processing. Master AI engine 102 may determine, based on these aspects including the features and machine learning algorithms as well as corresponding parameters, that a global machine learning model. The determination of the global machine learning model may be based on certain pre-determined rules. The rules may include a weighted combination of the real AI engines 101 taking into consideration of the labeled data and unlabeled data. Alternatively, the rules may include selecting a subset of real-time AI engines 101 according to certain criteria. The criteria can be based on factors such as the error rate, the recall rate, the time for performing the task, or different combinations of these factors. Alternatively, the rules may include disengaging certain real-time AI engines 101 based on the rules taking into consideration these factors. Master AI engine 102 may, through model dispatcher 214, update the real-time AI engines based on the determined features and machine learning algorithms. The update can be corrections to the labeled data.

After master AI engine 102 determines a set of real-time AI engines for the machine learning task at hand, master AI engine 102 may combine the set of AI engines based on certain combination strategy such as a consensus strategy, a majority rule strategy, or a learning rate strategy. This process may be repeated iteratively until master AI engine 102 reaches a convergent point of the iterative training process, resulting the global machine learning model for the master AI engine 102.

Each iteration of the training process may generate a version of master AI engine 102. In one implementation, different versions of master AI engines may be assembled 216 to generate a production model 218 that may be used in the practical application without further interference by the operators.

In this way, the hierarchical infrastructure combines the ability of master AI engine 102 with light-weight AI engines 101 to learn multiple operator's expert knowledge through different approaches, resulting the optimal result. The hierarchical machine learning architecture is much more efficient than traditional machine learning process in the sense that the traditional machine learning model training requires lots of labeled data in a training set, which may take weeks or months to be prepared in a single database. The data labeling process is time-consuming, and the quality of the labeled data is usually not guaranteed (different people may label the same data differently, or even the same people may label the same data differently from time to time). It is very difficult to label enough accurate data for many machine learning projects. In addition, the subject matter experts (SMEs), or the user operators, who label the data, could know little about the machine model(s). Therefore, some labeled data may not be useful for machine learning to learn a good model. Real-time AI engines 101 can interact with the SMEs to learn knowledge from a particular SME. However, real-time AI engines 101 by themselves cannot aggregate all SMEs knowledges together. An individual real-rime AI engine 101 is not exposed to enough data variations to learn a comprehensive model. The hierarchical machine learning architecture allows the master AI engine 102 to work at the backend to aggregate information received from all front-end real-time AI engines into one machine learning model by collecting all SME's knowledges from real-time AI engines running on the edge.

Figure 3:
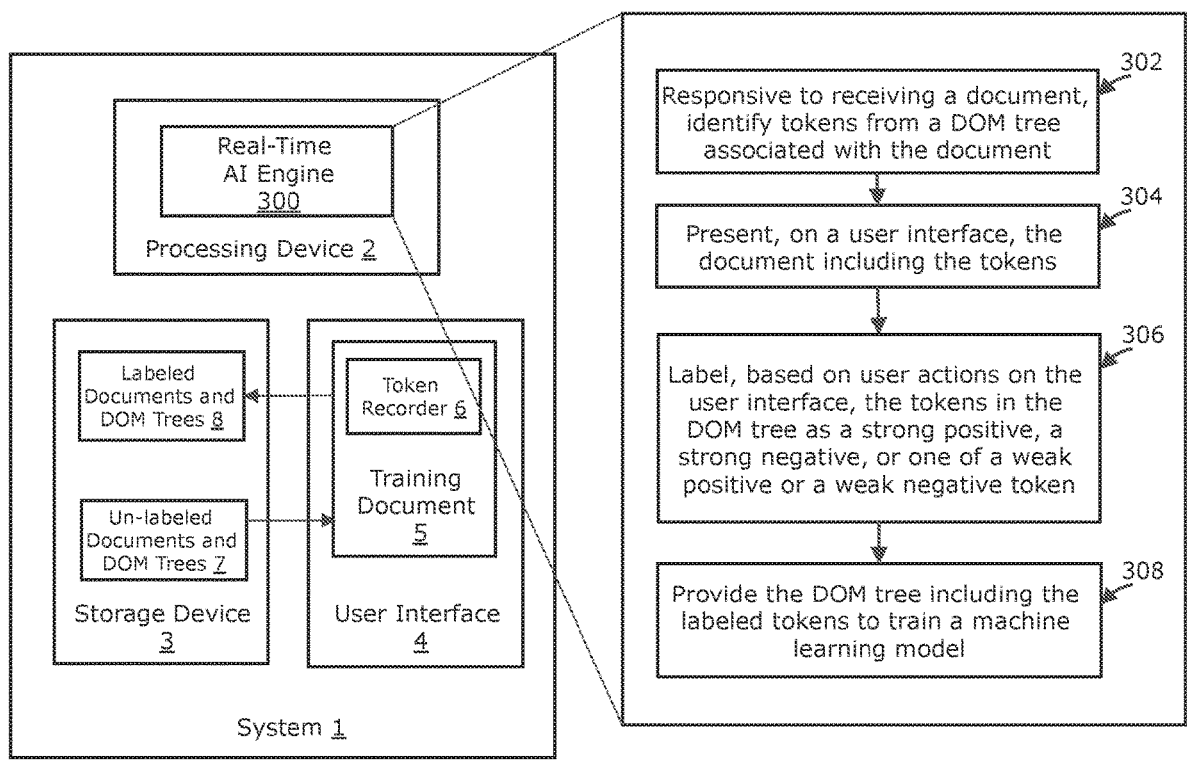
FIG. 3 illustrates a system implementing a real-time AI engine according to an implementation of the disclosure.

FIG. 3 illustrates a system 1 implementing a real-time AI engine according to an implementation of the disclosure. Referring to FIG. 3, system 1 may include a processing device 2, a storage device 3, and a user interface device 4, where the storage device 3 and the user interface device 4 are communicatively coupled to processing device 2.

Processing device 2 can be a hardware processor such as a central processing unit (CPU), a graphic processing unit (GPU), or an accelerator circuit. User interface device 4 may include a display such as a touch screen of a desktop, laptop, or smart phone. User interface device 4 may further provide a graphical user interface that the user may interact with elements presented on the graphical user interface using an input device such as a mouse or touch screen. The graphical user interface may be implemented using a web browser, Java UI, C #UI, etc. For a concise description, the graphical user interface is also referred to as the user interface 4. Storage device 3 can be a memory device, a hard disc, or a cloud storage connected to processing device 2 through a network interface card (not shown).

Processing device 2 can be a programmable device that may be programmed to present user interface 4 on the user interface device. User interface 4 can be a graphical user interface ("GUI") that allows a user using an input device (e.g., a keyboard, a mouse, and/or a touch screen) to interact with graphic representations (e.g., icons) thereon. In the training stage, processing device 2 may present, on user interface 4, a training document 5 and a token recorder 6. The training document 5 can be any suitable types of documents such as, for example, Microsoft Word documents, Microsoft Excel spreadsheet, Microsoft PowerPoint slides, Google Doc, Google Sheet, Google Slides, PDF, HTML, XML, plain Text (.txt), Email, Call Center Conversations, Chatbot Conversations, and JSON. The document itself can be a financial form, a business form, a government form, a medical form, or a legal form.

Figure 4:
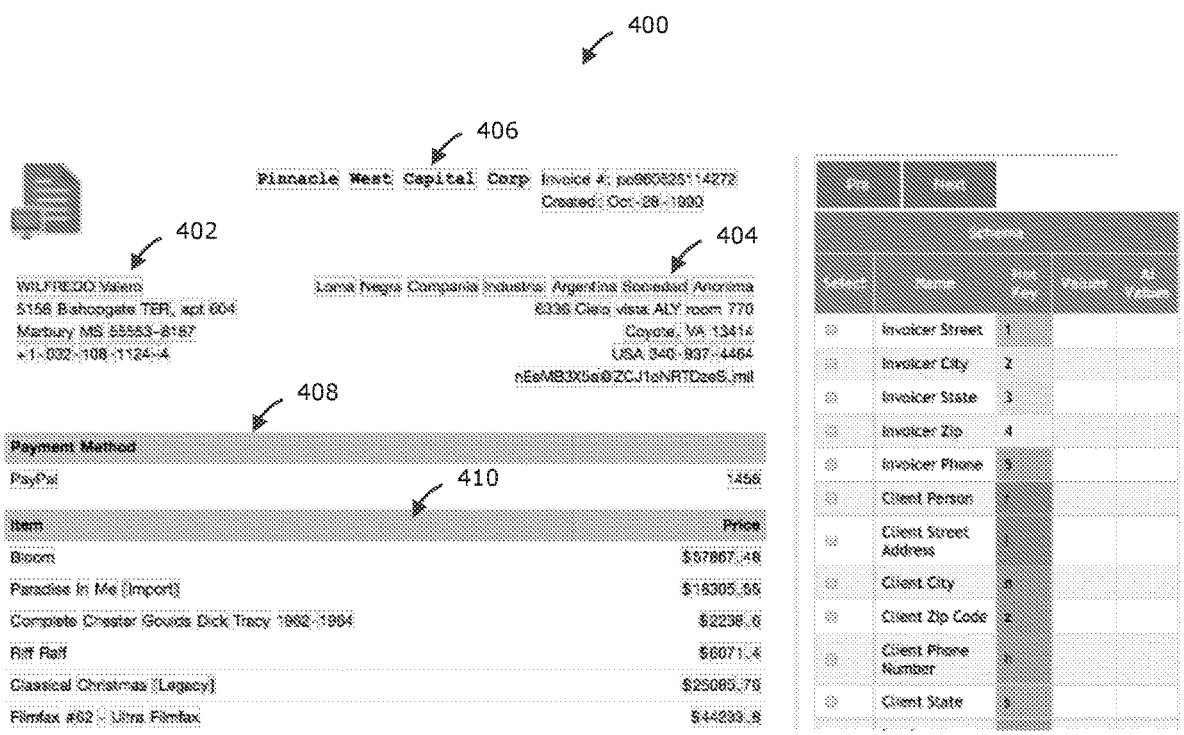
FIG. 4 illustrates a document that may be used as a test data.

FIG. 4 illustrates a document 400 that may be used as a test data. Document 400 as shown in FIG. 4 is an invoice including issuer information fields 402 (e.g., name or company name, address, telephone numbers), receiver information fields 404 (e.g., name or company name, address, telephone numbers, e-mail address), invoice information fields 406 (e.g., financial institute name, invoice identification, date), payment method field 408 (e.g., payment method, amount), and item fields 410 (e.g., items, amounts for items). In this example, these fields 402-410 may include words, numbers, and alphamerical strings that are referred to as tokens. These tokens are shown within box frames. In other applications, the tokens can be sentences or paragraphs in different languages. Operators can create their own different tags in the user interface. They can name their labels as well as the hot keys related to the labels from the user interface. Different tags may be represented in different colors. The content in different tags are shadowed in the related color.

Referring to FIG. 3, processing device 2 may also present a token recorder 6 for capturing user select (marking as positive) or de-select (marking as negative) actions applied to tokens in document 5. Responsive to receiving document 5, processing device 2 may pre-process document 5. The pre-processing may include generating a document object model (DOM) tree associated with the document. The DOM tree is a cross-platform, language-independent tree structure where each node of the tree is an object representing a part of document 5. The part of document 5 can be a sentence or a paragraph in document 5. Processing device 2 may then execute a tokenizer to split out tokens from the sentences or paragraphs in the DOM tree. Each token is a basic unit in the document that can be detected by the machine learning model. Thus, a token can be a word, a number, or an alphanumerical string. Once the tokens are split out, tokens can be presented on the user interface along with the documents. For example, as shown in FIG. 4, each token is presented with a box surrounding the token.

An operator may use token recorder 6 to label tokens during the training process. Token recorder 6 can be a program that is run on processing device 2 for capturing operator's select/de-select actions and record these actions in the corresponding DOM tree as positive or negative labels. Prior to the training process, unlabeled documents and the associated DOM tree 7 may be stored in storage device 3, and the labeled document and the associated DOM tree 8 may also stored in storage device 3.

The operator may be in the loop to assist the training of the machine learning model. In one implementation, processing device 2 may execute a real-time AI engine 300. To this end, processing device 2 may responsive to receiving a document for training purpose, identify tokens from a DOM tree associated with the document 302; present, on a user interface, the document including the tokens 304; label, based on user actions on the user interface, the tokens in the DOM tree as one of a strong positive, a strong negative, or one of a weak positive or a weak negative token 306; and provide the DOM tree including the labeled tokens as input to train a machine learning model 308.

The following sections describe operations of real-time AI engine 300 in detail. At 302, responsive to receiving a document, processing device 2 may identify tokens from a DOM tree associated with the document. As discussed above, processing device 102 may receive a document used for the training purpose. In a preprocessing step, a DOM tree has been generated the DOM tree for the document. The DOM tree may include nodes containing sentences and/or paragraphs containing tokens.

At 304, processing device 2 may present, on user interface 4, the document including the tokens. As shown in FIG. 4, processing device 2 may present the document on user interface 4 and pre-labels the tokens using framed boxes. These labeled tokens are presented for the operator to take further training actions.

At 306, processing device 2 may label, based on user actions on the user interface 4, the tokens in the DOM tree as one of a strong positive, a strong negative, or one of a weak positive or a weak negative token. To improve the speed and accuracy of machine learning model training, implementations of the disclosure may provide multiple-level label to tokens. Compared to the binary labels, implementations may provide three or four levels of labels. The multiple levels may include a strong positive, a strong negative, a weak positive, and a weak negative token. For example, a three-level label scheme may include a strong positive level, a strong negative level, and one of a weak positive or a weak negative level. A four-level label scheme may include the strong positive level, the strong negative level, the weak positive level, and the weak negative level.

The operator may employ user interface 4 to tag tokens in the training document presented thereon. Processing device 2 may execute recorder 6 to record operator's labeling in the DOM tree 7 associated with the document. Responsive to an operator select (or affirm) action of a token, recorder 6 may mark the selected token as a strong positive in the DOM tree 7. In general, the operator can label a token, a sentence, or a paragraph as strong positive. Processing device 2 may further predict a weak negative token based on the strong positive token. In one implementation, processing device 2 may determine non-tagged N tokens surrounding a labeled strong positive token (e.g., N nearest neighbors, where N is greater than one) and label these N tokens as weak negative tokens because the operator fails to select them in the labeling process. Thus, a weak negative token means a potential negative token determined implicitly based on the inaction of the operator. In one implementation, tokens that are identical to the positive tokens but unlabeled may also be treated as weak negative tokens. The training process may be carried out progressively in one or more iterations. In each iteration, the intermediate machine learning model generated during the prior iteration may be used to label tokens in the documents. These machine-generated labels associated with tokens may be determined as incorrect by the operator (e.g., based on operator's knowledge). Responsive to the operator's correction of a machine-generated label for a token (e.g., removing the label associate with the token), processing device 2 may label the token in the DOM tree as a strong negative token. Processing device 2 may label those tokens whose machine-generated labels are not corrected by the operators as weak positive tokens (or potentially positive tokens). It should be noted that through the labeling process, as long as the operator tags more tokens and correct errors made by the machine learning model, processing device 2 may follow the training steps to dynamically update the strong positive, the strong negative, the weak positive, and the weak negative token designations in the DOM tree.

At 308, processing device 2 may provide the DOM tree including the labeled tokens to train the machine learning model. The training process may include update the parameters of the machine learning model based on the training dataset including the DOM tree. The updates of the parameters may be based on a gradient descent algorithm that minimizing the errors in the output. In one implementation, the update of the parameters of the machine learning model may be invoked with respect to each update of the DOM tree. The update of the DOM tree may be caused by one or more user tag actions. In this way, the machine learning model may be trained in real time.

In one implementation, the strong (positive and negative) and weak (positive and negative) may be associated with different weightings in the training process. Thus, the different levels of tokens may impact the training process differently.

The input to the machine learning model can be features extracted from the tokens of different levels (strong positive, strong negative, weak positive, weak negative). Features are property values derived from tokens. Implementations of the disclosure may provide two types of features including format features and natural language processing (NLP) features. The format features associated with a token may include the token location in the DOM tree, the ancestors (e.g. the parent) in the DOM tree, the sibling tokens (e.g., tokens with the same parent in the DOM tree), the token cell, the token line, the token row, the token column, the token header row, the token header column, the sentence containing the token, the paragraph containing the token etc. The NLP features may include an n-gram associated with the token (an n-gram refers to a contiguous sequence of n items from a given token, where the items can be phonemes, syllables, letters, or base pairs), token capitalization, token character repeatable patterns, token regular expressions, token name entity recognition (NER) (a domain dictionary) etc. Implementations of the disclosure may provide a feature extractor (not shown) that, when executed by processing device 2, may extract format features and NLP features associated with tokens, and provide these extracted features as input feature vectors to the machine learning model in the real-time model training. Based on the token levels, the input feature vectors may be associated with different weights. For example, the feature vectors of the strong positive tokens may be associated with a large positive weight; the feature vectors of the weak positive tokens may be associated with a small positive weight; the feature vectors of the strong negative tokens may be associated with a large negative weight; the feature vectors of the weak negative tokens may be associated with a small negative weight. In this way, the training of the machine learning model can be more accurate and converging faster to achieve real-time performance.

Besides positive and negative tokens, there are still a lot of tokens that are not designated as either positive or negative in the document. These unlabeled tokens are ignored from training, thereby further reducing the complexity of the model training and speeding up the training (or learning) process. There can be more than 10,000 features generated from labeled tokens. A feature selection process may be used to reduce the feature space. After the feature selection, the number of features may be reduced to around 1000 without losing meaningful features. All the positive and negative tokens with the remaining features will be converted to a sparse matrix where each row is an instance, and each column is a feature. Table 1 illustrates an example table that shows tokens and their corresponding feature weights.

TABLE 1

| Token | Feature1 | Feature2 | Feature3 | Feature4 | FeatureN | Label |
|---|---|---|---|---|---|---|
| po960525114272 | 1 | 1 | 0 | 0 | 1 | 2 |
| Invoice | 0 | 1 | 1 | 0 | 1 | −1 |

TABLE 1-continued

| Token | Feature1 | Feature2 | Feature3 | Feature4 | FeatureN | Label |
|---|---|---|---|---|---|---|
| # | 0 | 0 | 1 | 1 | 0 | −1 |
| Corp | 0 | 1 | 0 | 0 | 1 | −1 | where the weights are 2 for strong positive tokens, 1 for weak positive tokens, −2 for strong negative tokens, and −1 for weak negative tokens.

Implementations of the disclosure may employ linear models to further reduce the time for model training to achieve real-time interactions between the operator and system. Implementations may automatically select a suitable algorithm based on the training data and training model with a set of parameters. After that, a machine learning model can be trained in a very short period of time (e.g., in less than one second). The trained model along with all the positive and negative tokens in the DOM tree associated with the document may be sent and stored in a data record in storage device 3. Implementations may further provide checkpoints to the machine learning model stored in the storage device 3. The checkpoints may be used to restore the machine learning model and continue the training in case of accidental data losses during the model training. During the training, the intermediate machine learning model can be applied on the current document to show the intermediate results generated based on the intermediate machine learning models. The operator may use the user interface 4 and recorder 6 to confirm (strong positive) and/or correct (strong negative) the intermediate results. Adjacent predicted tokens may be merged into a single entity with certain unpredicted tokens allowed in between. The machine predicted entities may be highlighted in a slightly different color with a "X" mark near (e.g., on the top right of) each token under an entity to notify the operator for confirmation or correction.

Figure 5:
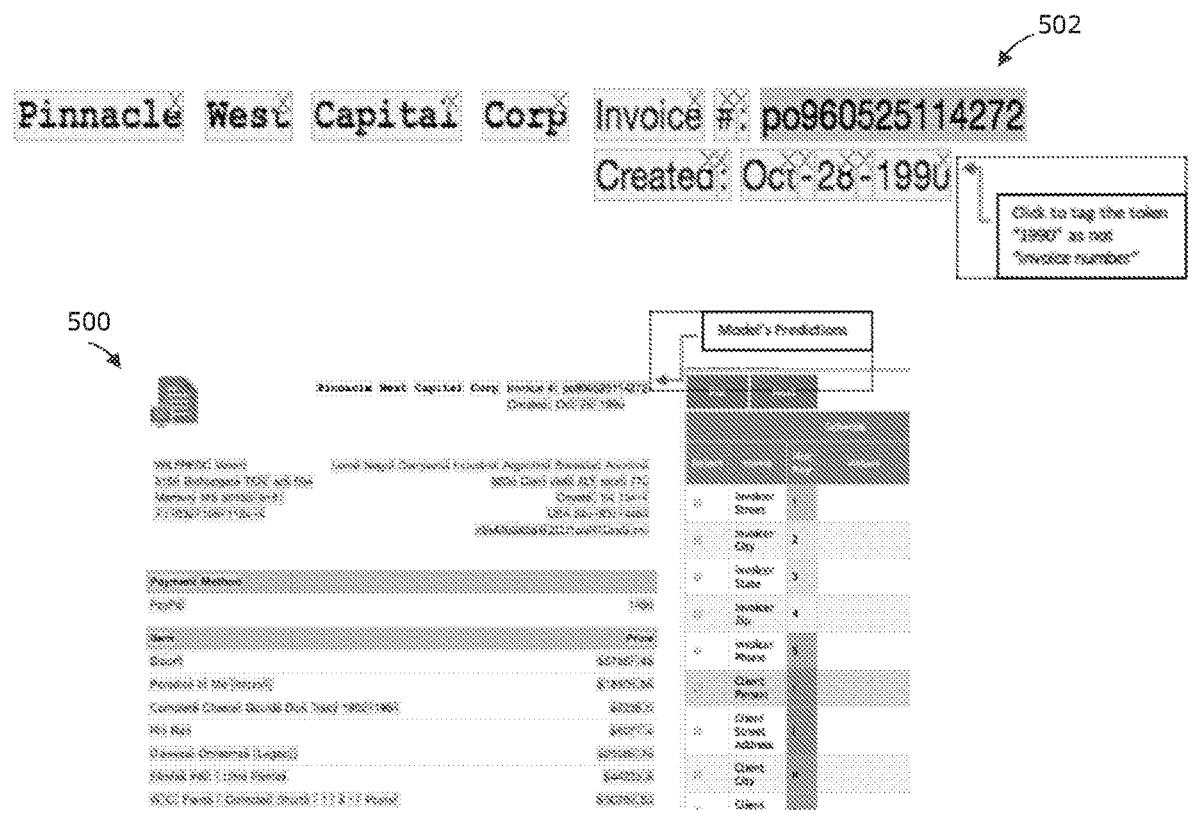
FIG. 5 illustrates a document including machine-labeled tokens according to an implementation of the disclosure.

FIG. 5 illustrates a document 500 including machine-labeled tokens according to an implementation of the disclosure. As shown in FIG. 5, document 500 presented in a user interface may include tokens that are labeled by an intermediate machine learning model with a "X". The operator can make correction on a machine predicted token by clicking the red "X" to tag it as strong negative, or tag the token as a different label (it becomes a strong positive for that label). If the machine predicted token is correct, user does not need to change it. These unchanged machine predicted tokens will become weak positives for the next iteration of model training. For example, user click the red "X" on the top right of token "1990" to indicate that it is not the invoice number as shown in the enlarged portion 502.

After this operator's affirmations or corrections, processing device 2 may run the real-time AI engine 300 to update parameters of the machine learning model in real time, and the new model's results will be displayed as the document 5 on user interface 4. After one document is tagged correctly, user can load the next (or previous) document to continue to train the machine learning model. The trained machine learning model may be used to generate the final extracted values (e.g., the invoice number "po960525114272") and store the value in a database in storage 3. Further, the operator can load additional documents to verify the quality of the trained machine learning model, or to generate more training data. The more documents on which the model is trained, the better the model is and the less operator's influence is needed on tagging new data.

Figure 6:
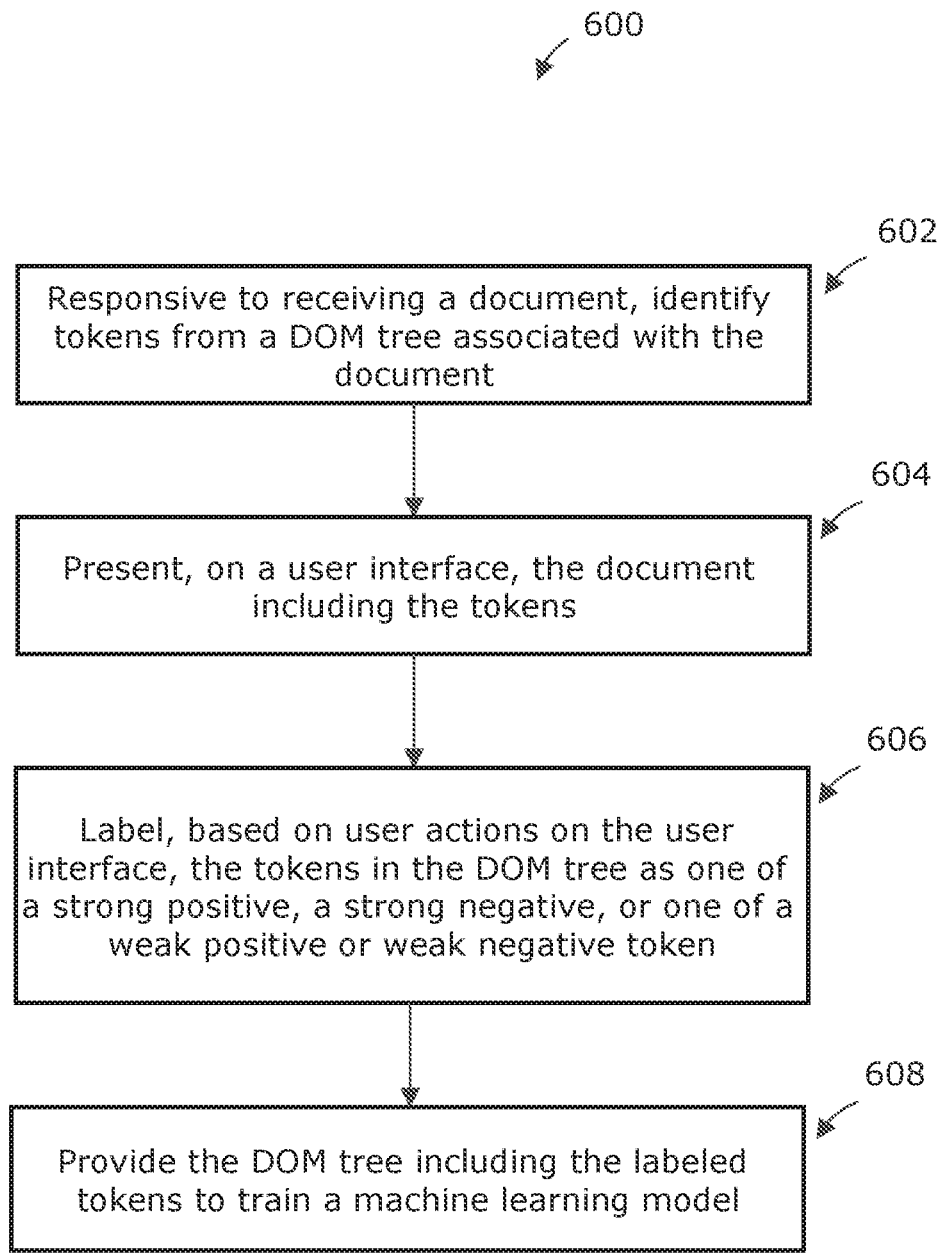
FIG. 6 illustrates a flowchart of a method for training a machine learning model in a real-time AI engine according to an implementation of the disclosure.

FIG. 6 illustrates a flowchart of a method 600 for training a machine learning model in real time according to an implementation of the disclosure. Method 600 may be performed by processing devices that may comprise hardware (e.g., circuitry, dedicated logic), computer readable instructions (e.g., run on a general purpose computer system or a dedicated machine), or a combination of both. Method 600 and each of its individual functions, routines, subroutines, or operations may be performed by one or more processors of the computer device executing the method. In certain implementations, method 600 may be performed by a single processing thread. Alternatively, method 600 may be performed by two or more processing threads, each thread executing one or more individual functions, routines, subroutines, or operations of the method.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be needed to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 600 may be performed by a processing device 2 executing real-time AI engine 300 as shown in FIG. 3.

As shown in FIG. 6, responsive to receiving a document, processing device 2 may, at 602, identify tokens from a DOM tree associated with the document.

At 604, processing device 2 may present, on a user interface, the document including the tokens.

At 606, processing device 2 may label, based on user actions on the user interface, the tokens in the DOM tree as one of a strong positive, a strong negative, or one of a weak positive or weak negative token.

At 608, processing device 2 may provide the DOM tree including the labeled tokens to train a machine learning model.

Figure 7:
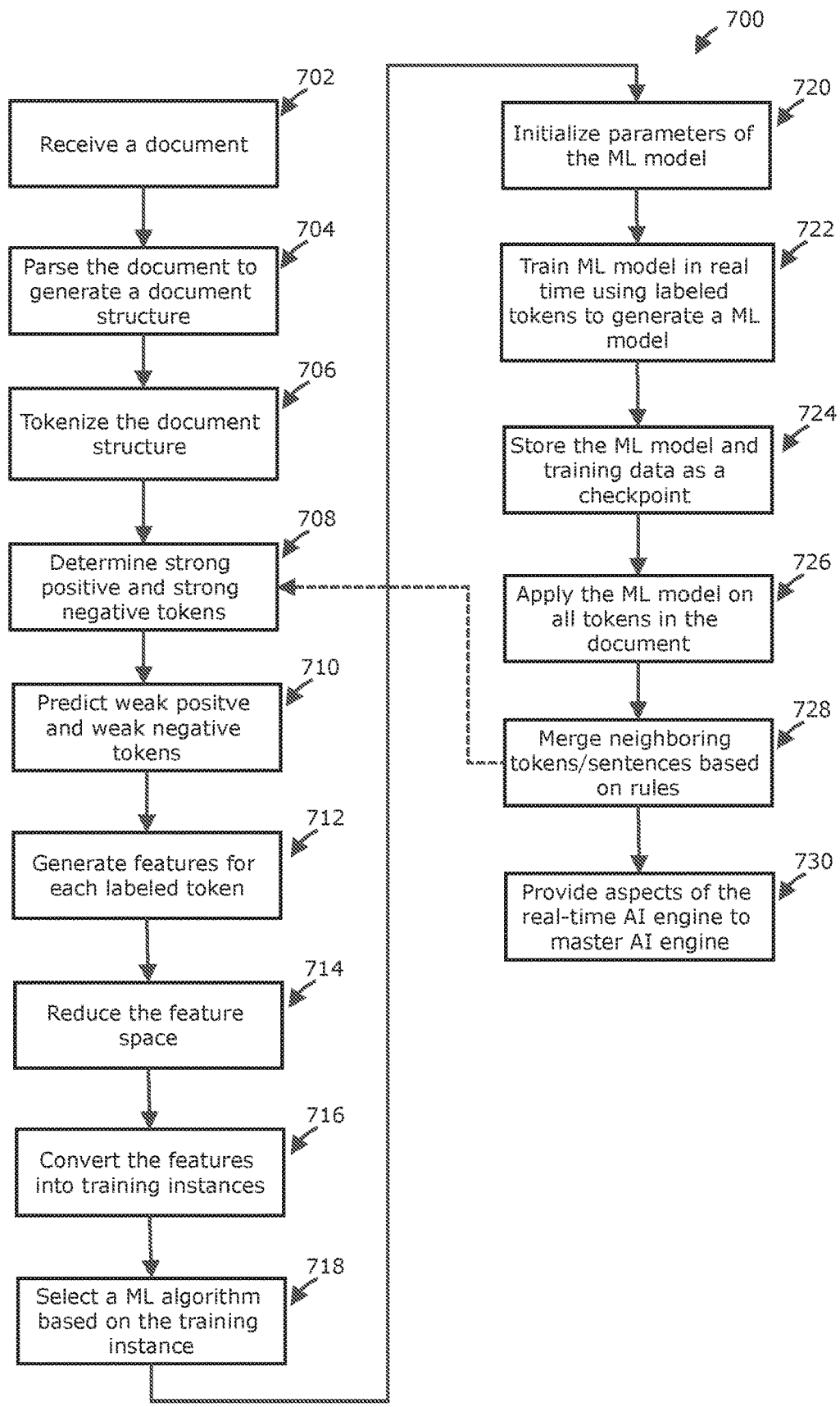
FIG. 7 illustrates a flowchart of a method for a real-time machine learning model according to an implementation of the disclosure.

FIG. 7 illustrates a flowchart of a method 700 for real-time machine learning model according to an implementation of the disclosure. Method 700 may be implemented on and executed by a processing logic (e.g., processing device 2 as shown in FIG. 3).

As shown in FIG. 7, method 700 may include the following operations. At 702, the processing logic may receive a document as the training data. The document can be an input file in a certain format (e.g., .docx, .pdf, .txt, .html, .xml, .xlsx, etc.). The document can be previously labeled by an expert for model training, or provided as a training data based on an operator's knowledge. Implementations may include format conversions to convert to a common format (e.g., .html).

At 704, the processing logic may parse the document to generate a document structure. The document structure can be an internal data object that is substantially similar to a DOM tree. Then, the processing logic may detect paragraphs and/or sentences to further tokenize the document.

A sentence can be the text associated with a DOM tree node, or the text separated by special punctuations such as comma, period (in English and Chinese). Implementations may also include a dynamic sentence detector that may detect the boundary of user-labeled entities by computing the boundary tokens' entropies between inside the entity and outside the entity. When the entropy is less than a threshold T, the token may identify a start/end of a sentence, where the threshold T can be specified as $1/\log(N+1)$, where N is the number of tokens.

A paragraph can be detected based on the input document spacing style. The characters which are close to each other measured according to pixels will be grouped together as a pre-paragraph. Pre-paragraphs will be merged to form a paragraph according to their meanings' similarity using a group of related models used to produce word embeddings (e.g., the word2vec package).

At 706, the processing logic may tokenize the document structure to split tokens out of the sentences and/or paragraphs. Each token is a basic unit in the document that can be detected by the machine learning model. Thus, a token can be a word, a number, or an alphanumerical string. Once the tokens are split out, tokens can be presented on the user interface along with the documents.

A universal tokenizer is defined as following: for western languages such as English, Spanish, etc., implementations may use white space (\t, \n, space, \r) and punctuations that separate strings as tokens. Each punctuation itself is also a token, and white spaces will be ignored. Empty tokens will be ignored as well. For Eastern languages such as Chinese, Japanese, Korea, etc., implementations may use each single character as a token. White spaces will be ignored.

At 708, the processing logic may determine strong positive tokens and strong negative tokens based on the operator's select actions applied on the user interface. As discussed above, the real-training may include several iterations that each may generate an intermediate model producing intermediate token labels presented on the user interface. Operators can create their own different tags in the user interface. They can name their labels as well as the hot keys related to the labels from the user interface. Different tags are represented in different colors. The content in different tags are shadowed in the related color.

After creating different tags, operators are able to highlight the content related to different tags through a pop-up menu by a right mouse click as well as a hot key in the user interface. The operator can remove the incorrect prediction by clicking the red "X" on the top-left side of each word as well as pressing the space button on the selected tokens. The operator's behaviors will be recorded by the UI interface and the model will be updated. The selected tokens are recorded as strong positive tokens, and the removed tokens are recorded as strong negative tokens. The updated model will be used to make updated predictions by each behavior.

At 710, the processing logic may further predict weak positive tokens and weak negative tokens. The weak positive tokens can be those model-generated positive tokens upon which the operator does not take an action. The processing logic is able to predict negative examples from the identified strong positive tokens (referred to as gold data). Additionally, the processing logic ignores irrelevant tokens. In comparison, the training of traditional machine learning models uses all non-positive tokens as negative tokens. By providing multiple levels (at least three) of tokens and disregarding irrelevant tokens, the processing logic is able to train the machine learning model to reach the target accuracy with much fewer tagged data and with much faster speed.

In a typical machine learning model, there are only positive and negative indicators used for model training. Implementations of the disclosure, however, provide for strong and weak positives as well as strong and weak negatives. Different indicators may be associated with different weights during training of the machine learning model. The weights may be determined by the data. By implementing both strong and weak indicators, the machine learning model can not only use the particular input by the operator (as strong positive/negative), but also be able to use its own estimations (as weak positive/negative) to finish the training fasters, thus achieving a higher accuracy with less computing power.

At 712, the processing logic may generate features for each labeled token. real-time AI engines can generate nature language processing features automatically. Compared to common machine learning models which require a data scientist to choose NLP features manually, implementations of the real-time training application is able to generate features straightly from data without user intervention. All these features are universal to any NLP applications. The NLP features may include token features, line features, table features, paragraph features, and domain knowledge features. The token features may include the token text, N-gram, token capitalization style, whether the token is a number or not, token digit count (how may digits [0-9] in the token), left N tokens, right N tokens, on left of another token text, an on right of another token text. The line features may include line start tokens, line end tokens, and whether line contains tokens. The table features may include cell start tokens, cell end tokens, cell contains tokens, left cell start tokens, left cell end tokens, left cell contains tokens, right cell start tokens, right cell end tokens, right cell contains tokens, above cell start tokens, above cell end tokens, above cell contains tokens, below cell start tokens, below cell end tokens, below cell contains tokens, first cell in column (table header) start tokens, first cell in column (table header) end tokens, first cell in column (table header) contains tokens, first cell in row (table header) start tokens, first cell in row (table header) end tokens, first cell in row (table header) contains tokens, column number, and row number. The paragraph features may include paragraph start tokens, paragraph end tokens, next paragraph start tokens, next paragraph end tokens, previous paragraph start tokens, previous paragraph end tokens, and header tokens. The domain knowledge features may include any name entity list (e.g., US states, company names, etc.), and any regular expression patterns (e.g., US phone numbers, US zip codes etc.). All features are injected into the internal document structure (e.g., the DOM tree object) as an additional tag attribute for each token/line/cell/paragraph.

At 714, the processing logic may reduce the feature space to further speed up the training process. Through automatic feature generation at 712, a feature space containing more than 10,000 features may be generated for each document. Implementation of the disclosure may further include a feature selection step that can select important features automatically and quickly. After the feature selection process, the total number of features in the feature space may be reduced to around 1000 without losing meaning features. The feature selection step may include the following elements: features that can identify fewer than N tokens in N tagged training documents, will be ignored because these features are very likely to overfit the machine learning model; features not associated with any strong positives or any strong negatives will be ignored; features having exactly the same distribution will be grouped into one feature. In one implementation, the feature selection is dependent upon the dataset. While the operator keeps tagging the data, the features selected by the feature selection step may keep updating.

At 716, the processing logic may convert each token with the associated features in the reduced feature space into a training data instance. For a particular token, there may be multiple instances in the document.

At 718, the processing logic may select a machine learning algorithm for training. After the feature generation and selection procedures, the processing logic nat choose most a suitable ML algorithm for each unique type of data. To make the learning process fast enough for the operator to interact in real time, the following light weighted candidate algorithms are used: linear regression, logistic regression, decision tree, support vector machine (SVM), Naïve Bayes, and LightGBM. The selection of the algorithm and the model training together can all be carried out in a very short period of time.

At 720, the processing logic may initialize the parameters of the selected machine learning model when the training first started. The initialization may assign the parameters to default values.

At 722, the processing logic may perform real-time machine learning model training using the labeled tokens. The training processing may include updating the parameters of the machine learning model according to certain rules (e.g., using a gradient descent algorithm to minimize the errors in the output). The training process may generate a trained machine learning model.

At 724, the processing logic may optionally store the trained machine learning model in a storage device and create a checkpoint for the trained model to recovery in case of an accidental data loss.

At 726, the processing logic may apply the train machine learning data to all tokens available in the document. This may generate the detection result of applying the trained machine learning model.

At 728, the processing logic may optionally merge neighboring tokens and/or sentences based on rules. At this point, the operator may determine that the trained model may need further training or improvement. If so, the processing logic may repeat the process starting from step 7508 using the same document or a new document. Otherwise, at 730, the processing logic may present the machine-generated detection results on the user interface.

In one implementation, the feature selection, algorithm selection, algorithm parameter initialization, and the training of the machine learning model can all be implemented in JavaScript running in a web browser in a single thread. All these steps are optimized so that the computing can be performed inside a web browser with computer with minimum hardware resources for just running a web browser. No extra computing power is needed. A background server is used to keep track of the checkpoints of the real-time machine learning model training, so that no model training is done outside the web browser. This kind of optimization makes the real-time machine learning model virtually work on any computing devices where a web browser is supported. The Edge Computing design allows the real-time machine learning to be able to be deployed in large organizations quickly without extra system setup/installation, and it is cross platform (works for Windows/Linux/Mac, etc.).

Implementations of the disclosure may learn more than what the operator has labeled in a single document. The model can detect different contents related to the same label, even if the same content has not labeled by the user before. For each label, the user is not required to label all the cases manually. Instead, the model is able to make predictions based on previous labeled data (e.g., strong positive tokens and strong negative tokens), contextual information, NLP information, file formatting information, etc. Therefore, the operator just needs to label very few examples. The training application may learn the knowledges from the operator very quickly. For example, an invoice date may be in different formats such as "January 1, 2019", "Jan. 1, 2019", "2019-01-01", with different prefix keywords such as "created", "invoice date", "date", "Inv Date", etc. In such cases, the model does not need to be trained on all of the variations, thus improving the speed of model training.

The user interface may provide real-time feedbacks to the results generated by the trained machine learning model. Implementations can give real-time feedbacks for each operator's action on the user interface (e.g., a web browser). For example, once the operator highlights some entities, in a couple of seconds, the machine learning model is learned, and the model is automatically applied to all the tokens on that document. The entities recognized by the machine learning model will be highlighted. Therefore, the predictions can be observed directly from the user interface and be corrected by the operator immediately. Once the operator highlights new contents and tag them (or de-highlights the incorrect predictions), the recorder may record the actions, and the model will be updated. The updated model will be used to make new predictions. The new predictions can be observed from the user interface right after the operator's operation.

Implementations may also allow the ability to run the machine learning model directly on a local personal machine. Not only the training can be performed inside local web browser, the running of the AI model learned on many unseen data can also be performed inside the operator's local web browser. While traditional machine learning needs huge computing power on cloud or on super-computer to apply the learned machine learning models, implementations of the disclosure require very low computing power to apply the model. A personal laptop with more than 1 core CPU will be enough to run the rea-time machine learning model. It can be run from local personal machine while still generating the output at a high speed. The application of the machine learning model in local web browser can be performed in parallel by starting multiple browser tabs.

Compared to label manually, implementations of the real-time machine learning can label different data formats according to operator-specified labels much quicker with a substantially consistent accuracy as a human operator. For example, for a document with 10 labels, it may take 5 minutes for a user to label. The real-time machine learning can finish the work within several seconds.

The real-time machine learning models as described in the disclosure require very few strong positive tokens to train, usually 10-20 examples for a particular content format. Compared to traditional machine learning models which require a large amount of data and weeks or even months to train, implementations can reach the same accuracy within 10 minutes.

Further, the real-time machine learning can achieve the operator's best performance because it monitors what the operator does, and all observations are used by the real-time machine learning to fine-tune the model. In general, real-time machine learning can achieve over 90% precision and over 80% recall rate, which is much higher than a regular machine modeling with the same amount of data.

Figure 8:
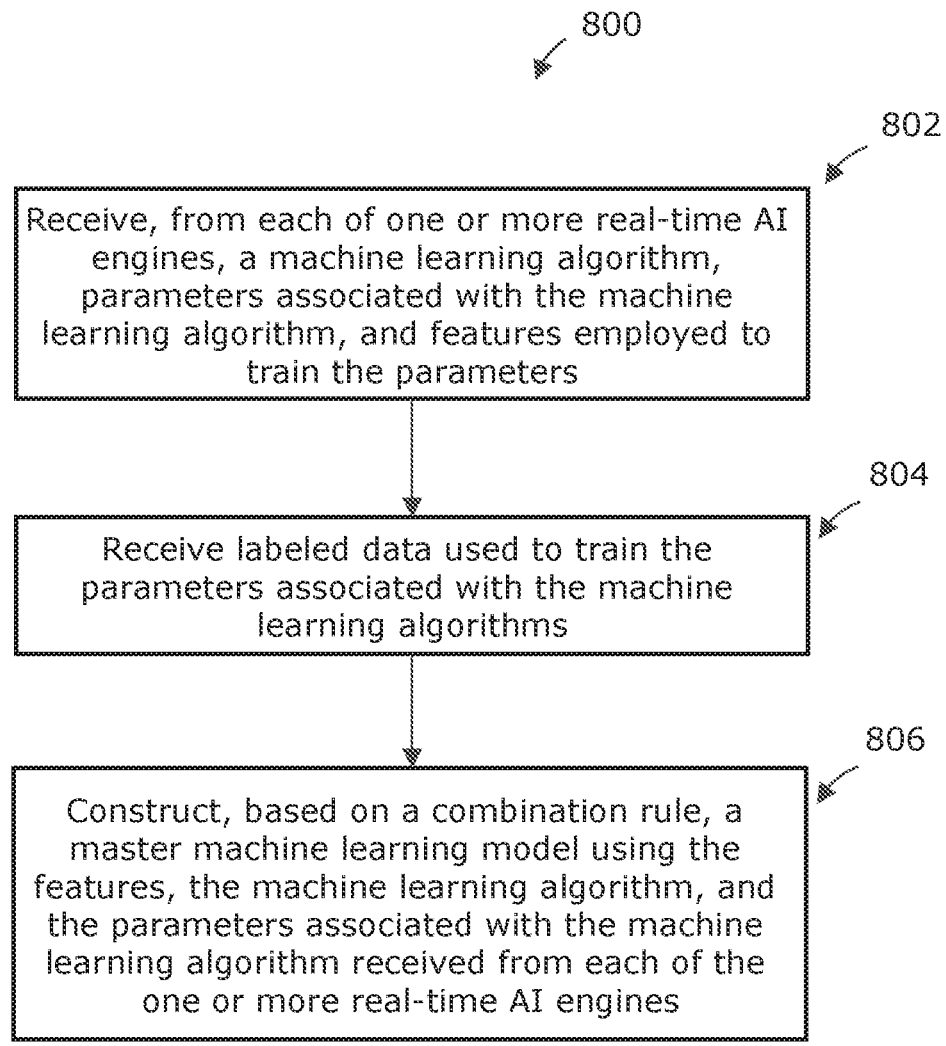
FIG. 8 illustrates a flowchart of a method of hierarchical machine learning according to an implementation of the disclosure.
Figure 9:
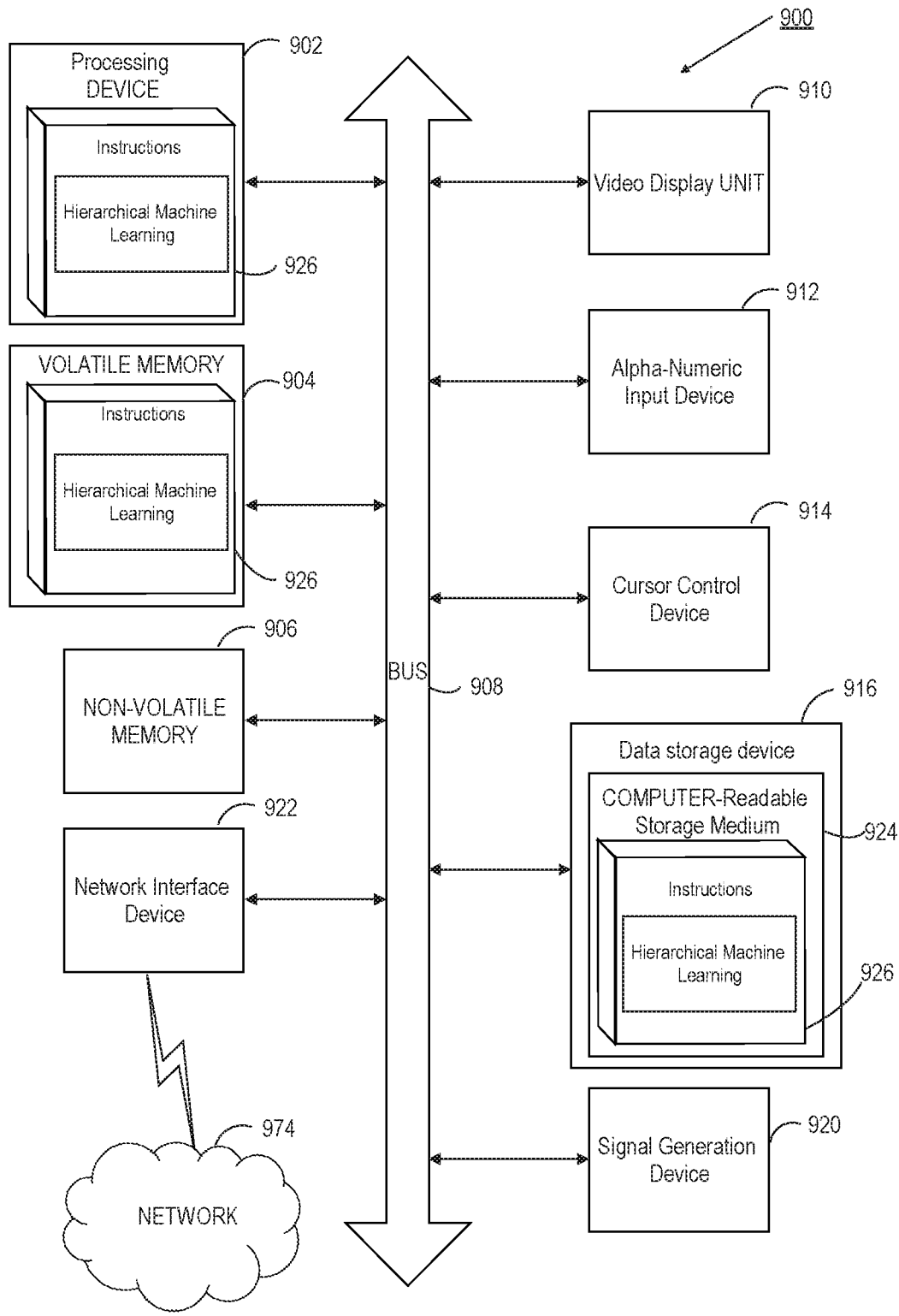
FIG. 9 depicts a block diagram of a computer system operating in accordance with one or more aspects of the present disclosure.

FIG. 8 illustrates a flowchart of a method 800 of hierarchical machine learning according to an implementation of the disclosure. Method 800 may be implemented on and executed by a processing logic (e.g., one or more hardware processing device as shown in FIG. 9).

At 802, the processing logic implementing a master AI engine may receive, from each of one or more real-time AI engines, a machine learning algorithm, parameters associated with the machine learning algorithm, and features employed to train the parameters. Each real-time AI engine may, as discussed above, include a light-weight machine learning algorithm that may be specified by a corresponding set of parameters that may be trained using features generated from labeled data.

At 804, the processing logic may receive labeled data used to train the parameters associated with the machine learning algorithm. The labeled data may include the strong positive and strong negative tokes (referred to as the "gold data") that are labeled by the operator sitting in the training loop of each real-time AI engine and optionally, the weak positive and weak negative tokens that are inferred by the real-time AI engines based on the gold data. In some implementations, the processing logic may also receive tokens that are not labeled by the real-time AI engines. The processing logic may label these tokens not labeled by the real-time AI engines as weak-negative.

At 806, the processing logic may construct, based on a combination rule, a master machine learning model using the features, the machine learning algorithm, and the parameters associated with the machine learning algorithm received from each of the one or more real-time AI engines. The construction of the master machine learning model may include combining the real-time AI engines through a weighted-average combination rule.

In one implementation, the processing logic may apply all of the labeled data and unlabeled data received from the one or more real-time AI engines to each of the one or more real-time AI engines to calculate a respective score, and calculate the respective engine weight value as a ratio between the respective score and a sum of all scores. In particular, the engine weight value associated with each real-time AI engine may be calculated as following. Because, the master AI engine already receives all of the rea-time AI engine information, the master AI engine may apply the machine learning algorithm of a real-time AI engine (e.g., rAI1) to the labeled data received from other real-time AI engines to generate a corresponding score rAI1-F1. The master AI engine may similarly calculate a corresponding score for each of the real-time AI engines (rAI1-F1, rAI2-F1, . . . , rAIn-F1), and calculate a sum of all these scores. The engine weight value associated with each real-time AI engine can be the ratio between the score of the real-time AI engine and the sum of all scores. The master AI engine can be the weighted average of each real-time AI engine times the corresponding engine weight value. In this way, the master AI engine can be a weighted ensemble based on each real-time AI model's performance on the gold data generated by other real-time AI engines. Since each real-time AI engine was learned from a human operator, the trained real-time AI engine may encode the operator's knowledge. The more agreement a real-time AI engine has with other real-time AI engines, the better the machine learning model of the real-time AI engine as reflected by a higher weight value associated with the real-time AI engine.

The master AI engine may further cross-validate the gold data received from different real-time AI engines and provide feedbacks through a model dispatcher to feed back to the real-time AI engines. To this end, the master AI engine may apply the master machine learning model to the labeled data received from the one or more real-time AI engines to determine updated labels for the labeled data, determine, based on the updated labels, whether the labeled data are correctly labeled or incorrectly labeled, and provide a feedback comprising the determined correctly labeled data and incorrectly labeled data to the one or more real-time AI engines for a further training of the one or more real-time AI engines. Each of the real-time AI engines may further rely upon the correctly labeled data (correctly labeled tokens) to further train the real-time AI engines. This process of training real-time AI engines, providing the updated machine learning algorithms, parameters, and features to the master AI engine, and updating the master AI engine may be repeated iteratively until the performance of the master AI reaches a convergent point.

Each iteration may generate a version of the master AI model. Some of these models may be assembled together into one global model when applying unseen data in the production. Depending on the requirements from the customer, there could be many different ways to assemble a global machine learning model. An AI tool such as the AutoML package may be used in the assembling step to determine the best assemble method for the given dataset based customer's project requirements. For example, some projects may need high precision with a lower recall rate is acceptable, while other projects may need high recall rate with a permissible lower precision. For the same candidate models, different assemble methods can rebalance the tradeoff between precision and recall. Some assemble rules used in master AI engine can be a consensus rule, a majority rule, or a learning rate rule.

The consensus rule is described in the following. In a consensus rule, if and only if all models agree on an instance's output class, then the instance is determined to be in that class as the final result. Otherwise, the assembled model output unknown (or not sure). This assemble method can also be applied to one or certain number of output classes to improve the precision of these particular classes in the final result. For example, for a binary classification problem including class 0 and class 1. The Master AI engine can apply this assemble method only on class 0 so that an instance belongs to class 0 only if all models classify this instance into class 0. Otherwise, the instance is treated as class 1. This will boost class 0's precision (with lowering its recall).

Another usage is to boost both class 0 and class 1 precision. If and only if all models classify one instance to class 0, its final result is class 0. Otherwise, this instance is placed into a third class (unknown class). In the same way, if and only all models classify one instance to class 1, its final result is class 1. Otherwise, this instance is placed into the unknown class. In this way, both class 0 and class 1 precision can be boosted. Any ambiguous instances can be placed into the unknown class which may be routed to a human operator for further determination. The same method can also be applied to multiple class classification problems.

The majority rule is described in the following. In the majority rule, for an instance, its final class is decided by the majority of all models' classification results. If the majority votes are even for more than one class, then use the aggregated prediction score of all models. The class with the highest aggregated prediction score will be the final class of the instance. For example, if 6 out of 10 models classify it as class 0, and the other 4 models classify it as class 1, the final result of this instance will be class 0. In another examples, if 5 out of 10 models (e.g. model1, model2, model5, model6, and model10) classify it as class 0, the other 5 models (e.g. model3, model4, model7, model8, and model9) classify it as class 1. To break the tie, the master AI engine may sum the prediction scores of model1, model2, model5, model6, and model10 as score0, and sum prediction scores of model3, model4, model7, model8, and model9 as score1. If score0>score1, then the instance has class 0, otherwise, the instance has class 1.

In some cases, not all models should be treated equally among each other. The learning rate-based assemble may take model in a time series and apply a learning rate to each model. A learning rate is a number between 0 and 1. For example, if the learning rate is 0.9, and the models learned by the master AI engine in sequence are model1, model2, model3, model4, and model5. The final model will be either Model_Final01 or Model_Final02 depends on the project prefers to the older data or the newer data. Model_Final01 prefers to the new data, and Model_Final02 prefers to the old data are defined as:

$$Model\_Final01=(((model1*0.9+model2)*0.9+model3)*0.9+model4)*0.9+model5$$

$$Model\_Final02=model1+0.9*(model2+*0.9*(model3+0.9*(model4+0.9*model5)))$$

The hierarchical machine learning architecture as described in this disclosure including the rea-time AI engines connected to the master AI engine may facilitate a process for integrally combining the interactions among user, real-time AI engines on the edge, and the master AI engine as a host. The hierarchical machine learning architecture greatly improves the efficiency of a traditional machine learning training process while still achieving a high accuracy.

The hierarchical machine learning architecture may provide, but not limited to, the following advantages: 1. the whole infrastructure makes the final model more general, more robust, and more accurate; 2. a huge amount of labelled gold data can be generated using light-weight machine learning on the edge in a short time period; 3. using the AutoML to aggregate pre-existing AI models, which is faster and more accurate than traditional machine learning methods. The architecture allows user, Real-time AI and Master AI to interact with each other so that good machine learning models can be learned in a short period of time using little computing resource. The models can also be improved through the interactions in these processes.

FIG. 9 depicts a block diagram of a computer system operating in accordance with one or more aspects of the present disclosure. In various illustrative examples, computer system 900 may correspond to the processing device 2 of FIG. 3.

In certain implementations, computer system 900 may be connected (e.g., via a network, such as a Local Area Network (LAN), an intranet, an extranet, or the Internet) to other computer systems. Computer system 900 may operate in the capacity of a server or a client computer in a client-server environment, or as a peer computer in a peer-to-peer or distributed network environment. Computer system 900 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 900 may include a processing device 902, a volatile memory 904 (e.g., random access memory (RAM)), a non-volatile memory 906 (e.g., read-only memory (ROM) or electrically-erasable programmable ROM (EEPROM)), and a data storage device 916, which may communicate with each other via a bus 908.

Processing device 902 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 900 may further include a network interface device 922. Computer system 900 also may include a video display unit 910 (e.g., an LCD), an alpha-numeric input device 912 (e.g., a keyboard), a cursor control device 914 (e.g., a mouse), and a signal generation device 920.

Data storage device 916 may include a non-transitory computer-readable storage medium 924 on which may store instructions 926 encoding any one or more of the methods or functions described herein, including instructions of the real-time machine learning model training application 100 of FIG. 1 or the hierarchical machine learning as shown in FIG. 8.

Instructions 926 may also reside, completely or partially, within volatile memory 904 and/or within processing device 902 during execution thereof by computer system 900, hence, volatile memory 904 and processing device 902 may also constitute machine-readable storage media.

While computer-readable storage medium 924 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "receiving," "associating," "determining," "updating" or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform method 300 and/or each of its individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A hierarchical machine learning system implemented by one or more computers comprising:
    a storage device; and
    a processing device implementing a master artificial intelligence (AI) engine to:
        receive, from each of one or more real-time AI engines, a machine learning algorithm, parameters associated with the machine learning algorithm, and features employed to train the parameters;
        receive, from each of the one or more real-time AI engines, labeled data used to calculate the features;
        construct, based on a combination rule, a master machine learning model using the features, the machine learning algorithm, and the parameters associated with the machine learning algorithm received from each of the one or more real-time AI engines;
        apply the master machine learning model to the labeled data received from the one or more real-time AI engines to determine updated labels for the labeled data;
        determine, based on the updated labels, whether the labeled data are correctly labeled or incorrectly labeled; and
        provide a feedback comprising at least one of the determined correctly labeled or incorrectly labeled data to the one or more real-time AI engines for a further training of the one or more real-time AI engines,
    wherein each of the one or more real-time AI engine is to:
        responsive to receiving a document, parse the document to generate a document object model (DOM) tree, wherein each node of the DOM tree comprises one of a sentence or a paragraph of the document;

tokenize each node of the DOM tree to generate one or more tokens;
present, on a user interface, the document including the one or more tokens;
label, based on user actions on the user interface, at least one of the one or more the tokens in the DOM tree as one of a strong positive, a strong negative, or one of a weak positive or a weak negative token; and
provide the DOM tree including the labeled tokens to train a machine learning algorithm.

2. The system of claim 1, wherein each of the one or more real-time AI engines is further to:
responsive to detecting a first action on a first GUI element to positively mark a first token, label the first token as a strong positive token in the DOM tree and assign the strong positive token with a first weight value;
responsive to detecting a second action on a second GUI element to negatively mark a second token, label the second token as a strong negative token in the DOM tree and assign the strong negative token with a second weight value;
predict a third token as a weak negative token based on the strong positive token, wherein the weak negative token is at least one of spatially close to the strong positive token in the document or unmarked but identical to the strong positive token, and assign the weak negative token with a third weight value; and
label a fourth token as a weak positive token, wherein the fourth token is identified by the machine learning model as a candidate positive token, and assign the weak positive token with a fourth weight value.

3. The system of claim 2, wherein each of the one or more real-time AI engines is further to:
calculate the first features using the labeled tokens, wherein the first features comprise at least one a format feature or a natural language processing (NLP) feature;
reduce the first features to the features, wherein the features are a subset of the first features;
select the machine learning algorithm based on the labeled tokens; and
train the machine learning algorithm using the features to adjust the parameters associated with the machine learning algorithm taking into account of different weight values associated with different types of the labeled tokens.

4. The system of claim 3, wherein each of the one or more real-time AI engines is to:
provide the machine learning algorithm, the parameters associated with the machine learning algorithm, and the features to the master AI engine;
provide the labeled tokens as the labeled data to the master AI engine; and
provide unlabeled data to the master AI engine.

5. The system of claim 4, wherein to construct, based on a combination rule, a master machine learning model using the features, the machine learning algorithm, and the parameters associated with the machine learning algorithm received from each of the one or more real-time AI engines, the processing device is to:
label each of the unlabeled data as a weak negative;
calculate a respective engine weight value associated with each of the one or more real-time AI engines, wherein the engine weight value is calculated based on:
applying all of the labeled data and unlabeled data received from the one or more real-time AI engines to each of the one or more real-time AI engines to calculate a respective score; and
calculating the respective engine weight value as a ratio between the respective score and a sum of all scores; and
determine the master machine learning model as a weighted average of the one or more real-time AI engines by applying the engine weight value to the corresponding real-time AI engine.

6. The system of claim 1, wherein the processing device is further to:
receive, from each of further trained one or more real-time AI engines, an updated machine learning algorithm, updated parameters associated with the updated machine learning algorithm, and updated features employed to train the parameters;
receive the correctly labeled data used to train the updated parameters associated with the machine learning algorithm;
construct, based on the combination rule, a new version of the master machine learning model using the updated features, the updated machine learning algorithm, and the updated parameters associated with the updated machine learning algorithm;
assemble a global master machine learning model using different versions of the machine learning model according to an assemble rule; and
provide the global machine learning model to a machine learning task.

7. The system of claim 1, wherein the processing device is further to provide the master machine learning model to a machine learning task.

8. A method of hierarchical machine learning, the method comprising:
receiving, by a processing device from each of one or more real-time AI engines, a machine learning algorithm, parameters associated with the machine learning algorithm, and features employed to train the parameters;
receiving, from each of the one or more real-time AI engines, labeled data used to calculate the features;
constructing, based on a combination rule, a master machine learning model using the features, the machine learning algorithm, and the parameters associated with the machine learning algorithm received from each of the one or more real-time AI engines;
applying the master machine learning model to the labeled data received from the one or more real-time AI engines to determine updated labels for the labeled data;
determining, based on the updated labels, whether the labeled data are correctly labeled or incorrectly labeled; and
providing a feedback comprising at least one of the determined correctly labeled data or incorrectly labeled data to the one or more real-time AI engines for a further training of the one or more real-time AI engines, wherein each of the one or more real-time AI engines is to perform:
responsive to receiving a document, parsing the document to generate a document object model (DOM) tree, wherein each node of the DOM tree comprises one of a sentence or a paragraph of the document;
tokenizing each node of the DOM tree to generate one or more tokens;
presenting, on a user interface, the document including the one or more tokens;

labeling, based on user actions on the user interface, at least one of the one or more the tokens in the DOM tree as one of a strong positive, a strong negative, or one of a weak positive or a weak negative token; and providing the DOM tree including the labeled tokens to train a machine learning algorithm.

9. The method of claim 8, wherein each of the one or more real-time AI engine is further to perform:

responsive to detecting a first action on a first GUI element to positively mark a first token, labeling the first token as a strong positive token in the DOM tree and assign the strong positive token with a first weight value;

responsive to detecting a second action on a second GUI element to negatively mark a second token, labeling the second token as a strong negative token in the DOM tree and assign the strong negative token with a second weight value;

predicting a third token as a weak negative token based on the strong positive token, wherein the weak negative token is at least one of spatially close to the strong positive token in the document or unmarked but identical to the strong positive token, and assign the weak negative token with a third weight value; and labeling a fourth token as a weak positive token, wherein the fourth token is identified by the machine learning model as a candidate positive token, and assign the weak positive token with a fourth weight value.

10. The method of claim 9, wherein each of the one or more real-time AI engines is further to perform:

calculating the first features using the labeled tokens, wherein the first features comprise at least one a format feature or a natural language processing (NLP) feature;

reducing the first features to the features, wherein the features are a subset of the first features;

selecting the machine learning algorithm based on the labeled tokens; and training the machine learning algorithm using the features to adjust the parameters associated with the machine learning algorithm taking into account of different weight values associated with different types of the labeled tokens.

11. The method of claim 10, wherein each of the one or more real-time AI engines is further to perform:

providing the machine learning algorithm, the parameters associated with the machine learning algorithm, and the features to the master AI engine;

providing the labeled tokens as the labeled data to the master AI engine; and providing unlabeled data to the master AI engine.

12. The method of claim 11, wherein constructing, based on a combination rule, a master machine learning model using the features, the machine learning algorithm, and the parameters associated with the machine learning algorithm received from each of the one or more real-time AI engines, further comprises:

labeling each of the unlabeled data as a weak negative;

calculating a respective engine weight value associated with each of the one or more real-time AI engines, wherein the engine weight value is calculated based on:

applying all of the labeled data and unlabeled data received from the one or more real-time AI engines to each of the one or more real-time AI engines to calculate a respective score; and calculating the respective engine weight value as a ratio between the respective score and a sum of all scores; and determining the master machine learning model as a weighted average of the one or more real-time AI engines by applying the engine weight value to the corresponding real-time AI engine.

13. The method of claim 8, further comprising:

receiving, from each of further trained one or more real-time AI engines, an updated machine learning algorithm, updated parameters associated with the updated machine learning algorithm, and updated features employed to train the parameters;

receiving the correctly labeled data used to train the updated parameters associated with the machine learning algorithm;

constructing, based on the combination rule, a new version of the master machine learning model using the updated features, the updated machine learning algorithm, and the updated parameters associated with the updated machine learning algorithm;

assembling a global master machine learning model using different versions of the machine learning model according to an assemble rule; and providing the global machine learning model to a machine learning task.

14. The method of claim 8, further comprising providing the master machine learning model to a machine learning task.

15. A machine-readable non-transitory storage media encoded with instructions that, when executed by one or more computers, cause the one or more computer to implement a system for real-time machine learning, to perform operations of claim 1.

* * * * *